DEVICE FOR STABILISING THE OSCILLATION FREQUENCY OF
A MECHANICAL OSCILLATOR FOR TIME KEEPING INSTRUMENT

Filed Aug. 1, 1966

United States Patent Office 3,463,948

Patented Aug. 26, 1969

3,463,948

DEVICE FOR STABILISING THE OSCILLATION FREQUENCY OF A MECHANICAL OSCILLATOR FOR TIME KEEPING INSTRUMENT

Robert Favre, Lausanne, Switzerland, assignor to Fabriques Movado and Manufacture des Montres Universal Perret Freres S.A., La Chaux-de-Fonds, Switzerland Filed Aug. 1, 1966, Ser. No. 569,151
Claims priority, application Switzerland, Aug. 12, 1965, 11,350/65
Int. Cl. H02k *33/00, 35/00*
U.S. Cl. 310—25 5 Claims

ABSTRACT OF THE DISCLOSURE

In a mechanical oscillator for an electronically controlled timepiece having a predetermined frequency of vibration and which comprises two spaced vibratory elements oscillating in opposition of phase with a given amplitude, said elements having elastic return forces of mechanical origin along a principal direction; magnets are mounted on each of the elements, facing one another and lying entirely within the space operating the elements in order to generate magnetic forces in the same principal direction as the elastic return forces in order to stabilise the vibration frequency of the oscillator in a manner responsive to the amplitude.

Electronically controlled timepieces generally comprise magnetic means for setting parts of a mechanical vibrator serving the time keeping standard, such as a tuning fork into vibration towards and away from each other. A reciprocable motion converter such as a pawl is attached to one of these vibrating parts and cooperates with a ratchet wheel so as to cause rotation thereof during continuous oscillation of the vibrator. The ratchet is operatively connected to the conventional gear train of the watch so as to actuate the hand of the watch.

Precise mechanical oscillators usually have a structure which is dynamically balanced usually by the interaction of two similar elements oscillating in opposite phase such as the two branches of a tuning fork or the two arms of a torsion oscillator. However the frequency of a mechanical oscillator is never rigorously free of the amplitude. In those oscillators which for one reason or other cannot be stabilised in their amplitude as is the case with oscillators of electronic wrist-watches, the amplitude of which decreases with the voltage of the feed cell, this dependency is manifested by a frequency shift which sometimes cannot be tolerated.

The present invention precisely has for object a device for stabilising the oscillation frequency of a mechanical oscillator for time-keeping apparatus, this oscillator being dynamically balanced by a structure having two elements oscillating in opposite phase of a function of its amplitude and characterised by the fact that it comprises means rigid with the oscillating elements which engenders interacting forces in the same principal direction as the elastic return forces of mechanical origins of a magnitude, gradient and direction such as there results a stabilisation of the frequency of a function of the amplitude of oscillation.

The annexed drawing represents by way of example two embodiments of the present invention.

The simplest method for generating a magnetic interaction the effect of which is opposite to the return elastic forces of mechanical origin varying as a function of the amplitude of the oscillation consists in fixing two magnets in opposite phases, these elements preferably being formed of a poorly conductive material having a high coercive field such as an alloy known under the name of ferriedur.

Figure 1:
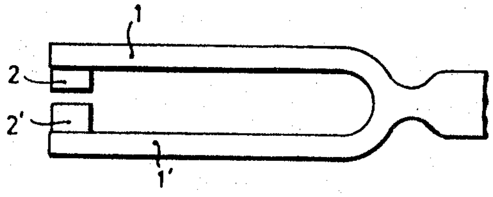
FIGURE 1 shows a tuning fork provided with a device for stabilising the frequency.

In the case of the tuning fork shown on FIGURE 1, tines 1 and 1' of the fork have at their extremities two magnets 2 and 2' facing one another and close to one another in such a way as to generate a magnetic interaction at high gradient. In a conventional electronic timepiece assembly, coils forming part of an electronic circuit cause the tines to move to and from each other. Also in conventional manner, a reciprocable element such as a pawl is attached to one of the tines to actuate a ratchet wheel which drives the gear train of the timepiece and hence the hands.

If the magnets are polarised for attraction they tend to reduce the frequency when the amplitude increases which can be explained in the following manner.

When branches 1 and 1' near one another during the oscillation, the magnetic attractive forces are in the inverse direction as the elastic forces of mechanical origin while these magnetic forces are in the same direction as the mechanical forces when the branches separate. The first effect tends to reduce the frequency and the second tends to increase it but owing to the high gradient of the magnetic forces of interaction, the first effect predominates over the second and the frequency tends to decrease when the amplitude increases.

If the magnets are polarised so as to repel one another, there is noted by a similar reasoning that the frequency then tends to increase with the amplitude.

A judicious choice of the parameters of magnetic interaction permits to substantially compensate for a frequency shift as a function of the amplitude along broad lines.

It is often that the transducing system for obtaining the oscillatory movement itself has an assembly of magnets which it is possible to involve in the compensating process. The same is true with the torsion oscillator shown on FIGURES 2 to 6.

Figure 2:
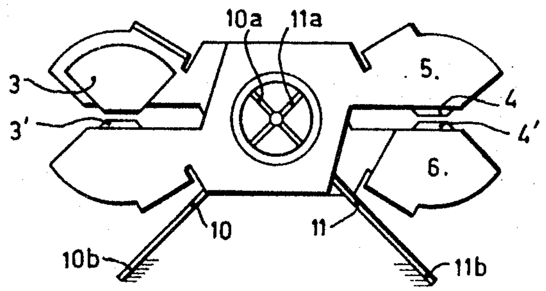
FIGURES 2 to 6 show different views of a stabilised portion oscillator provided with a frequency stabilising device according to the invention and is usable with timing units of the type shown in U.S. Patents 3,351,788 and 3,217,191.
Figure 3:
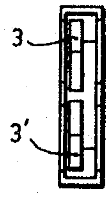
Figure 4:
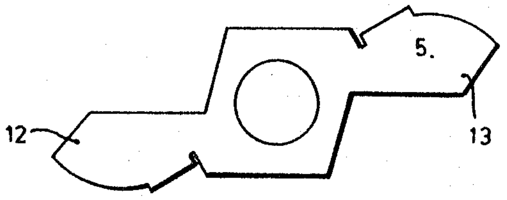
Figure 5:
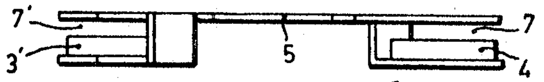
Figure 6:
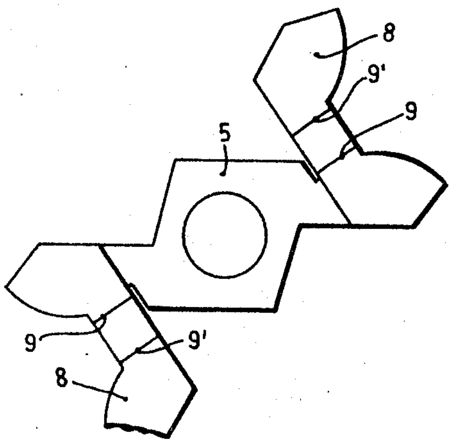

On FIGURE 2 is a plan view of a torsion oscillator which comprises two superimposed arms 5 and 6 having the general shape of an S on a torsion spring system formed by two flat springs 10 and 11 having respectively a bent part 10*a* and 11*a* in such a way as to form a torsion spring having a cruciform section at the ends of which are secured arms 5 and 6 and which are encased in the support at points 10*b* and 11*b*. Each of the oscillating arms 5 and 6 of which the arm 5 is shown alone in FIGURE 4, has on each of its extremities 12 and 13 a U-shaped part obtained by cutting a plate along the outline shown in FIGURE 6 and folding the jaws 8 by 90° along lines 9 and 9' in such a way as to obtain the shape shown on FIGURES 3 and 5.

The transducer system is formed by four magnets 3–3', 4—4' lodged at the same level in each of the U-shaped extremities of each of the arms 5 and 6. This transducer system comprises on the one hand a coil not shown which is common to two magnets 3 and 3' and a second coil not shown common to two magnets 4 and 4'. These two coils fit in space 7 and 7' of each of the U-shaped extremities of each of the two arms. In order that the oscillation of the arms 5 and 6 in counter phase generate a voltage in the coils it is necessary that the opposite magnets have the same polarity. It occurs that the frequency of such a torsion oscillator tends to diminish when the amplitude increases a phenomena which can be compensated by magnets polarised so as to repel. The same is true of the pair of magnets 3–3' and 4–4' which it suffices to have protrude in the space separating the two arms in the manner shown on FIGURE 2 in order to obtain the compensation desired.

The arms are made of ferro-magnetic material for example of iron or of an alloy having a high saturation induction which permits the setting up of a good magnetic circuit.

The device of the type shown on FIGURE 2 permits to reduce the frequency shift as a function of the amplitude in a ratio of 20 to 1 for an amplitude varying in a ratio of 1 to 2 and this by very simple means.

What is claimed is:

1. In a mechanical oscillator for use in an electromechanical oscillator system for an electronically controlled timepiece having a predetermined frequency of vibration and comprising, two spaced vibratory elements oscillatable in opposition of phase with a given amplitude, said elements having when oscillating elastic return forces of mechanical origin along a principal direction; magnets mounted on each of said elements, facing one another and lying entirely within a space separating said elements for applying magnetic forces to said vibratory elements in said same principal direction as said elastic return forces to stabilise said vibration frequency of said oscillator in a manner responsive to said amplitude.

2. Oscillator according to claim 1, wherein said magnets are similarly polarised so as to compensate for a decrease in frequency when the amplitude of oscillation increases.

3. Oscillator according to claim 1, wherein said magnets are oppositely polarised so as to compensate for an increase in frequency when the amplitude of oscillation increases.

4. Oscillator according to claim 1, comprising a pair of spaced, superimposed arms, a torsion spring including two flat springs secured to said arms, a V-shaped part at each extremity of said arms and magnets secured at each extremity of said arms in the space separating said arms.

5. Oscillator according to claim 4, wherein said arms consist of a material having a high saturation induction.

References Cited

UNITED STATES PATENTS

| | | | |
|---|---|---|---|
| 2,928,308 | 3/1960 | Godbey | 84—409 |
| 2,971,323 | 2/1961 | Hetzel | 310—25 XR |
| 2,950,447 | 8/1960 | McShan | 331—156 XR |
| 2,888,582 | 5/1959 | Hetzel | 84—409 XR |
| 3,167,905 | 2/1965 | Hetzel | 310—25 XR |
| 3,192,701 | 7/1965 | Tanaka et al. | 84—457 XR |
| 2,594,749 | 4/1952 | Ehrat et al. | 331—156 XR |
| 3,243,951 | 4/1966 | Kawakami. | |
| 2,665,581 | 1/1954 | Kean | 310—8 XR |

FOREIGN PATENTS

| | | |
|---|---|---|
| 6,709,050 | 3/1968 | Switzerland. |
| 283,314 | 1/1965 | Netherlands. |

WARREN E. RAY, Primary Examiner

B. A. REYNOLDS, Assistant Examiner

U.S. Cl. X.R.

58—23; 84—409, 457; 310—36